United States Patent
Yamagiwa et al.

(10) Patent No.: US 6,373,687 B2
(45) Date of Patent: Apr. 16, 2002

(54) GAS INSULATION SWITCH

(75) Inventors: Tokio Yamagiwa; Hiroki Honma, both of Hitachi; Koji Sasaki, Mito, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/918,807

(22) Filed: Aug. 1, 2001

Related U.S. Application Data

(63) Continuation of application No. 09/273,502, filed on Mar. 22, 1999.

(30) Foreign Application Priority Data

Mar. 25, 1998 (JP) ............................................. 10-76979

(51) Int. Cl.[7] ................................................. H02B 1/20
(52) U.S. Cl. ......................... 361/612; 218/70; 361/618; 361/619
(58) Field of Search .............................. 200/13, 43, 68, 200/75, 289; 218/43, 70; 361/233, 602, 605, 612–613, 618–619, 120

(56) References Cited

U.S. PATENT DOCUMENTS

| | | |
|---|---|---|
| 3,792,188 A | 2/1974 | Cronin |
| 3,792,220 A | 2/1974 | Yoshioka et al. |
| 4,041,545 A | 8/1977 | Deville |
| 5,661,280 A | 8/1997 | Kuss et al. |
| 6,018,134 A | 1/2000 | Hirano et al. |

FOREIGN PATENT DOCUMENTS

| | | |
|---|---|---|
| JP | 57-20109 | 2/1982 |
| JP | 6-2010 | 1/1985 |
| JP | 60-2009 | 1/1985 |
| JP | 60-2011 | 1/1985 |
| JP | 60-17802 | 1/1985 |
| JP | 60-17803 | 1/1985 |
| JP | 1-117611 | 5/1989 |

OTHER PUBLICATIONS

Japanese Electrotechnical Committee, No. 552, Jul., 1995, "Application Guide of Gas Insulation Switch (GIS)".

*Primary Examiner*—Gregory Thompson
(74) *Attorney, Agent, or Firm*—Mattingly, Stanger & Malur, P.C.

(57) ABSTRACT

To provide a gas insulation switch reducing the $SF_6$ gas use amount without damaging the insulation performance and arc extinguishing performance, the present invention uses $SF_6$ gas as insulating gas to be charged in the grounding tank 1 of a unit having a switching unit of the breaker 5, the disconnecting switches 3, 4, and 8, and the grounding switches 6, 7, and 9, for example, the line unit 190 and uses gas having a smaller warming coefficient than that of $SF_6$ gas, for example, nitrogen gas 23, or air as insulating gas to be charged in the grounding tank 1 of a unit having no switching unit, for example, the main bus units 100 and 110 and the connection bus unit 160.

5 Claims, 5 Drawing Sheets

US 6,373,687 B2

GAS INSULATION SWITCH

This application is a continuation application of U.S. Ser. No. 09/273,502, filed Mar. 22, 1999.

BACKGROUND OF THE INVENTION

The present invention relates to a gas insulation switch suitable for earth anti-warming measures. For example, as described in Engineering Report of Japanese Electrotechnical Committee, No. 552, "Application Guide of Gas Insulation Switch (GIS)" (issued on July 1995), the gas insulation switch (hereinafter called GIS) comprises a single or a plurality of gas insulated units and is installed in a switching station or substation. Each gas insulated unit comprises a grounding steel tank containing high voltage units such as a conductor unit, conductor connection unit, and switching unit and insulating spacers arranged so as to reserve an insulation distance between the high voltage units and the grounding tank, or so as to support the high voltage units, or so as to divide the grounding tank for each gas. As insulating gas, sulphur gas hexafluoride (hereinafter called $SF_6$ gas) having superior insulation performance and arc extinguishing performance has been used since 1970.

SUMMARY OF THE INVENTION

The GIS containing all charged units in the grounding steel tank is hardly affected by weather conditions, superior in environment resistance, and advantageous in reduction of the site of a switching station or substation, so that it has made rapid progress. Recently, however, $SF_6$ gas used for insulation of the GIS has an earth warming coefficient of about 24000 times of that of carbon dioxide ($CO_2$) and it is indispensable to reduce the amount used in the future from a viewpoint of anti-warming measures. As one of the $SF_6$ gas use amount reduction methods, application of mixed gas may be considered. However, when the gas is used for all the units constituting the GIS, the processing method in the case of an emergency such as gas separation is complicated. Therefore, it cannot be always said that it is a valid method.

The present invention is realized in consideration of the aforementioned conditions and provides a gas insulation switch for reducing the $SF_6$ gas use amount. The present invention also provides a gas insulation switch for reducing the $SF_6$ gas use amount without damaging the insulation performance and arc extinguishing performance. The present invention also provides a gas insulation switch for simply processing insulating gas and reducing the $SF_6$ gas use amount.

The first invention is a gas insulation switch comprising a container charged with insulating gas which contains an electric conductor and at least a pair of contractors which can be connected or disconnected and which is divided into a plurality of gas sections, sealed with insulating material, and wherein as the insulating gas of a gas section containing no separable contactors among the plurality of gas sections, insulating gas having a smaller earth warming coefficient than that of $SF_6$ gas is used.

The second invention is a gas insulation switch for at least a pair of separable contactors comprising a unit housing a breaker in a first grounding tank and a unit housing an electric conductor supported by an insulating support member in a second grounding tank, wherein the first grounding tank is charged with $SF_6$ gas and the second grounding tank is charged with insulating gas having a smaller earth warming coefficient than that of the aforementioned $SF_6$ gas.

The third invention is a gas insulation switch comprising a unit housing a breaker in a first grounding tank, a unit housing a conductor supported by an insulating support member in a second grounding tank, and a unit containing a gas insulating switch and a grounding switch in a third grounding tank, wherein the first grounding tank is charged with $SF_6$ gas and the second and third grounding tanks are charged with gas having a smaller earth warming coefficient than that of $SF_6$ gas.

The gas insulation switches of the first to third inventions mentioned above use one of nitrogen gas, and air, as insulating gas having a smaller earth warming coefficient than that of $SF_6$ gas. In the gas insulation switch of the third invention, the second grounding tank is charged with nitrogen gas or air and the third grounding tank is charged with mixed gas.

In the gas insulation switch of the second or third invention mentioned above, the pressure in the grounding tank charged with insulating gas having a smaller earth warming coefficient than that of $SF_6$ gas is set higher than the pressure in the grounding tank charged with $SF_6$ gas. The grounding tanks are mechanically connected via insulating spacers having conical convexes and arranged so that the convexes are located on the side of the grounding tanks charged with insulating gas having a smaller earth warming coefficient than that of $SF_6$ gas. The grounding tanks charged with insulating gas having a smaller earth warming coefficient than that of $SF_6$ gas are used as $SF_6$ gas collector containers.

The fourth invention is a gas insulation switch comprising a first unit housing a breaker in a grounding tank and a second unit housing an electric conductor supported by an insulating support member in a grounding tank, wherein the grounding tank of the first unit is charged with $SF_6$ (sulphur hexafluoride) gas, and the grounding tank of the second unit is charged with insulating gas having a smaller dielectric strength than that of the aforementioned $SF_6$ (sulphur hexafluoride) gas at the same pressure, and furthermore the insulation size of the second unit is made larger than the insulation size of the first unit in correspondence with the smaller dielectric strength.

The fifth invention is a gas insulation switch comprising a first unit housing a breaker in a grounding tank and a second unit housing an electric conductor supported by an insulating support member in a grounding tank, wherein the grounding tank of the first unit is charged with $SF_6$ (sulphur hexafluoride) gas, and the grounding tank of the second unit is charged with insulating gas having a smaller dielectric strength than that of the aforementioned $SF_6$ (sulphur hexafluoride) gas at the same pressure, and furthermore the pressure in the grounding tank of the second unit is made higher than the pressure in the grounding tank of the first unit in correspondence with the smaller dielectric strength, and the thickness of the grounding tank of the second unit is made wider in correspondence with the higher pressure in the grounding tank.

The gas insulation switch of the fourth or fifth invention mentioned above uses gas having a smaller earth warming coefficient than that of $SF_6$ (sulphur hexafluoride) gas as insulating gas having a smaller dielectric strength than that of $SF_6$ (sulphur hexafluoride) gas at the same pressure and the gas having a smaller earth warming coefficient is nitrogen gas, or air.

DETAILED DESCRIPTION OF PREFERRED EMBODIMENT

Figure 1:
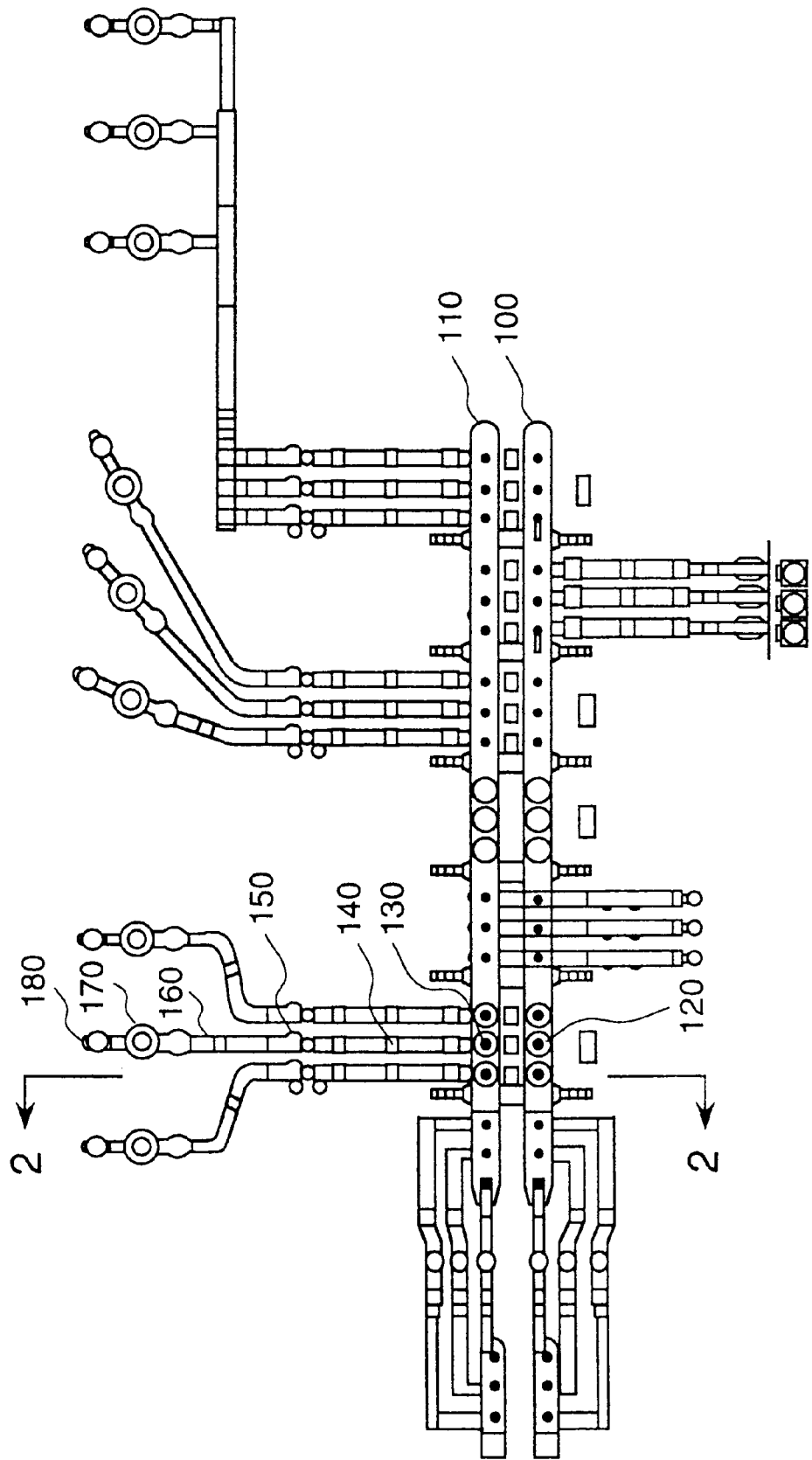
FIG. 1 is a plan view showing the whole constitution of a gas insulation switch of an embodiment of the present invention.
Figure 2:
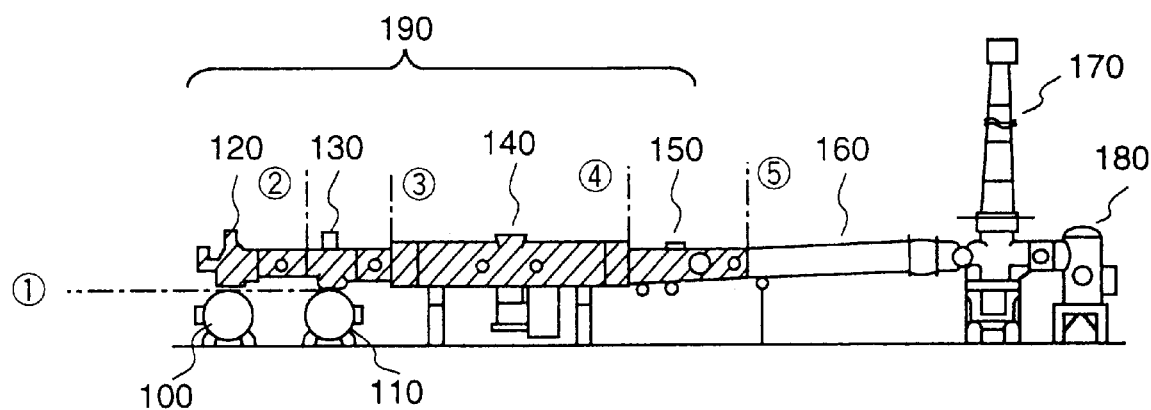
FIG. 2 is a cross sectional view taken along line 2—2 shown in FIG. 1.

The embodiment of the present invention will be explained hereunder with reference to the accompanying drawings. FIG. 1 shows an appearance constitution of a GIS of this embodiment and FIG. 2 shows a cross sectional view taken along line 2—2 shown in FIG. 1. In the drawings, numerals 100 and 110 indicate main bus units. Between the main bus units 100 and 110 and a bushing 170 connected to the transmission line, a line unit 190 comprising bus side disconnecting switch unit devices 120 and 130, a disconnecting switch unit device 140, and a line side disconnecting switch unit device 150 and a connection bus unit 160 are installed for each phase and the main bus units 100 and 110 and the bushing 170 are electrically connected to each other. At the line lead-in opening, a lightning arrester unit 180 having a lightning arrester for controlling an overvoltage is installed. Numerals [1] to [5] shown in FIG. 2 indicate classification of the unit devices constituting the line unit 190 and the portion put between [1] and [2] indicates the bus side disconnecting switch unit device 120. The portion put between [1], [2], and [3] indicates the bus side disconnecting switch unit device 130. The portion put between [3] and [4] indicates the disconnecting switch unit device 140. The portion put between [4] and [5] indicates the line side disconnecting switch unit device 150.

Figure 3:
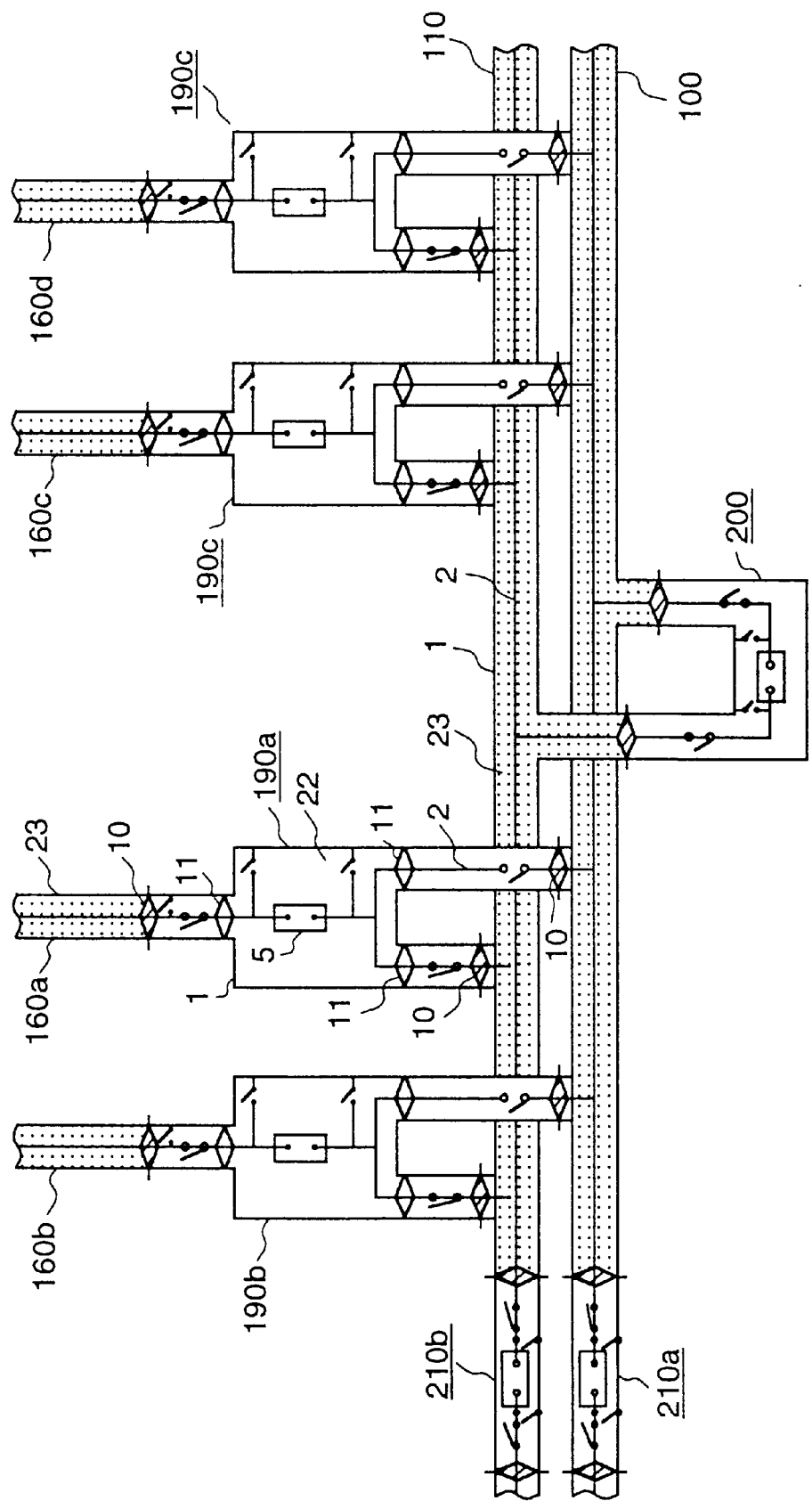
FIG. 3 is a cross sectional view schematically showing the constitution of a part of FIG. 1.

FIG. 3 shows a part of the constitution shown in FIG. 1 which is enlarged and schematically shown. To the main bus units 100 and 110, line units 190a to 190d are connected via insulating spacers 10. To the line units 190a to 190d, connection bus units 160a to 160d are connected via the insulating spacers 10. Between the main bus unit 100 and the main bus unit 110, a bus connection unit 200 is connected via the insulating spacers 10. Midway on the main bus units 100 and 110, bus classification unit devices 210a and 210b divided for each gas by the insulating spacers 10 are installed.

Figure 4:
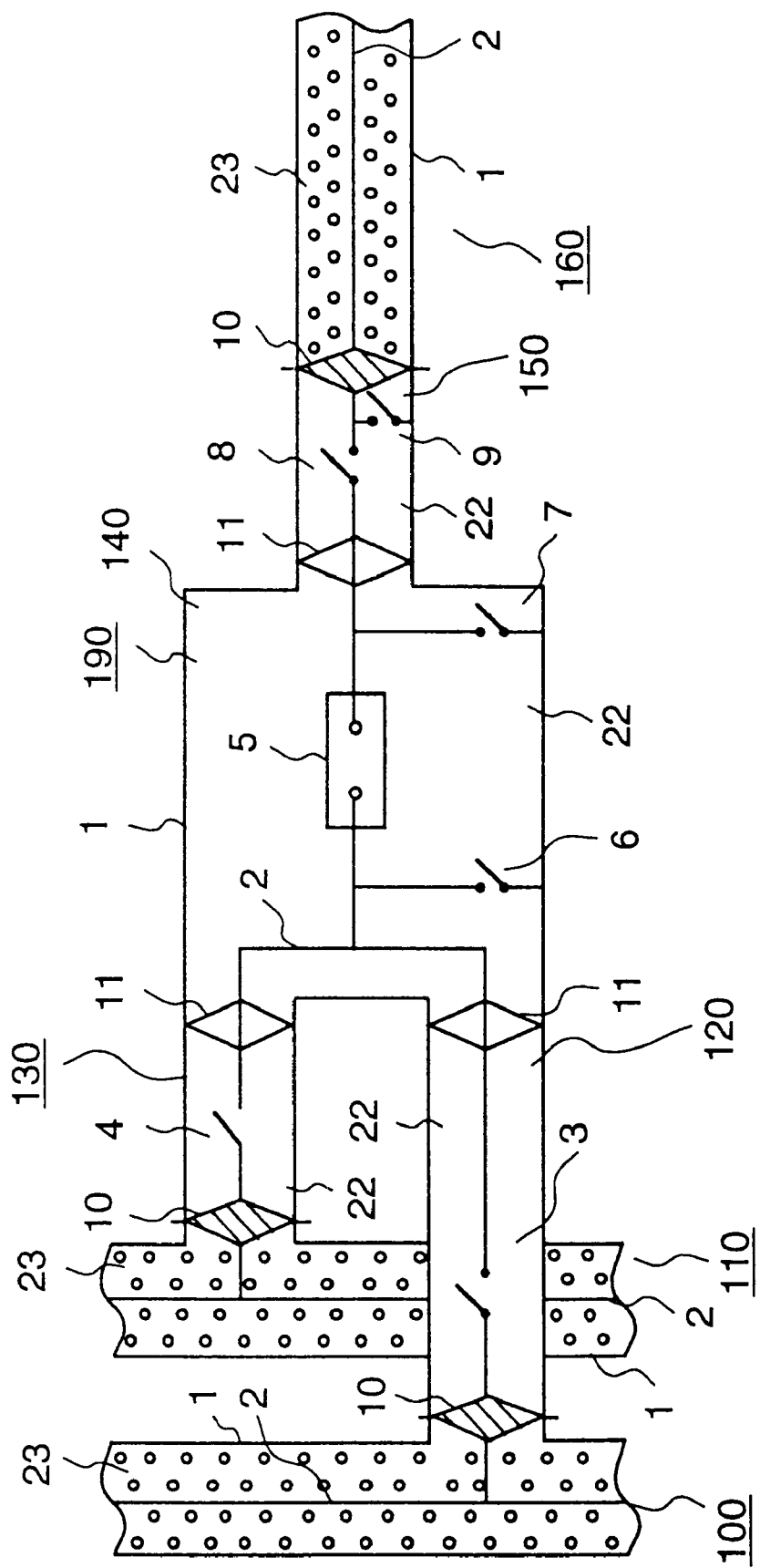
FIG. 4 is a cross sectional view showing the constitution of a main bus unit, line unit, and connection bus unit shown in FIG. 3 more in detail.

FIG. 4 shows the constitution of the main bus units 100 and 110, the line unit 190, and the connection bus unit 160 shown in FIG. 3 more in detail. The main bus units 100 and 110 house central conductors 2 for three phases in a batch in a grounding tank 1. The central conductors 2 branch halfway for each phase, supported by the insulating spacers 10, and extended on the side of the line unit 190. The line unit 190 constitutes the bus side disconnecting switch unit devices 120 and 130, the breaker unit device 140, and the line side disconnecting switch unit device 150, divided inside a grounding tank 1 by insulating spacers 11.

The bus side disconnecting switch unit device 120 houses a breaker 3 installed midway on the central conductor 2 toward the breaker unit device 140 from the main bus unit 100 via the insulating spacers 10 in the grounding tank 1. The bus side disconnecting switch unit device 130 houses a breaker 4 installed midway on the central conductor 2 toward the breaker unit device 140 from the main bus unit 100 via the insulating spacers 10 in the grounding tank 1.

The breaker unit device 140 houses a breaker 5 installed midway on the central conductor 2 toward the line side disconnection switch unit device 150 from the point portion of the central conductor 2 extended from the bus side disconnection switch unit device 120 via the insulating spacers 11 and the central conductor 2 extended from the bus side disconnection switch unit device 130 via the insulating spacers 11 in the grounding tank 1. At both ends of the breaker 5, grounding switches 6 and 7 with one end of each of them connected to the grounding tank 1 are installed.

The line side disconnecting switch unit device 150 houses a breaker 8 installed midway on the central conductor 2 toward the connection bus unit 160 from the breaker unit device 140 via the insulating spacers 10 in the grounding tank 1. At one end of the breaker 8, a grounding switch 9 with one end thereof connected inside the grounding tank 1 is installed.

The connection bus unit 160 houses the central conductor 2 in the grounding tank 1 and the central conductor 2 extends to the bushing 170 via an insulating spacer not shown in the drawing.

The line unit 190 divided by the insulating spacers 10 has a switching unit of the breaker 5, the breakers 3, 4, and 8, and the grounding switches 6, 7, and 9 and the current breaking performance is required. Therefore, this embodiment uses $SF_6$ gas 22 superior in the insulation performance and arc extinguishing performance as insulating gas to be charged in the grounding tank 1 of the line unit 190. On the other hand, the main bus units 100 and 110 and the connection bus unit 160 have no switching unit such as a breaker in the grounding tank 1, so that no current breaking performance is required. Therefore, this embodiment used nitrogen gas 23 or air which is an insulating gas having a smaller warming coefficient than that of $SF_6$ gas as insulating gas to be charged in the grounding tank 1 of the main bus units 100 and 110 and the connection bus unit 160.

Furthermore, in this embodiment, the grounding tank 1 constituting the line unit 190 is divided into the bus side disconnecting switch unit devices 120 and 130, the breaking unit device 140, and the line side disconnecting switch unit device 150 by the insulating spacers 11, so that the line unit 190 can be easily assembled and the charging gas pressure can be changed depending on the current breaking performance.

Furthermore, in this embodiment, in the portions divided by the insulating spacers 10 and the insulating spacers 11, that is, in the bus side disconnecting switch unit devices 120 and 130 and the line side disconnecting switch unit device 150, the breakers 3, 4, and 8 are installed and for the divided portions, a current breaking performance like that for the breaker 5 is not required. Therefore, mixed gas which is gas having a smaller warming coefficient than that of $SF_6$ gas may be used.

Figure 5:
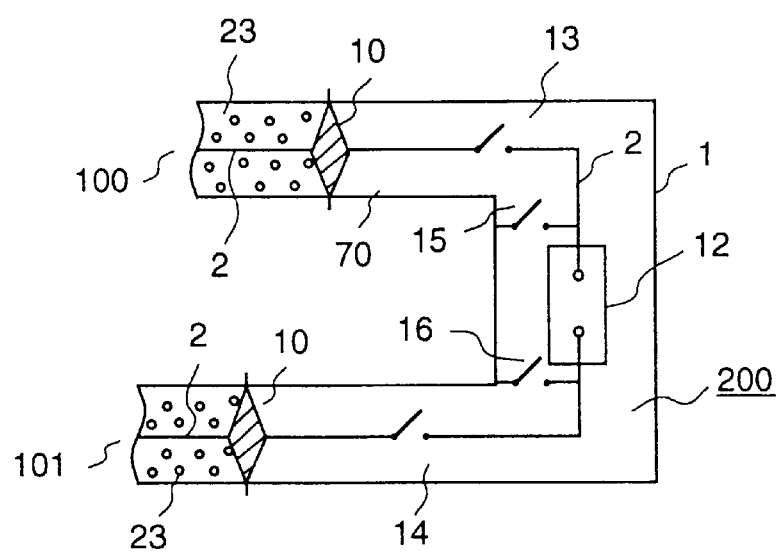
FIG. 5 is a cross sectional view showing the constitution of the bus connection unit shown in FIG. 3 more in detail.

FIG. 5 shows the constitution of the bus connection unit 200 shown in FIG. 3 more in detail. The bus connection unit 200 connects between the main bus unit 100 and the main bus unit 110 and houses the central conductors 2 for three phases in a batch in the grounding tank 1 divided by the insulating spacers 10. Midway on the central conductor 2, a disconnecting switch 13, a breaker 12, and a disconnecting switch 14 are installed. At both ends of the breaker 12, grounding switches 15 and 16 with one end of each of them-connected to the grounding tank 1 are installed. In the bus connection unit 200, the current breaking performance is required, so that $SF_6$ gas 22 is charged in the grounding tank 1 as insulating gas.

Figure 6:
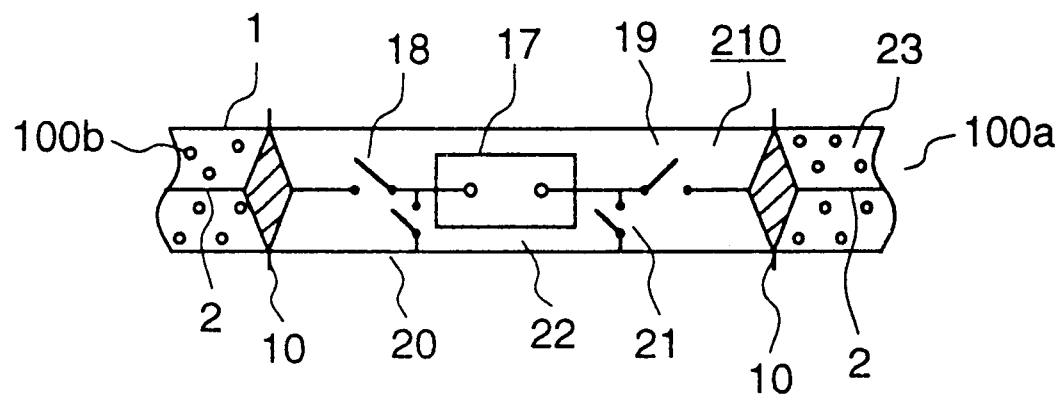
FIG. 6 is a cross sectional view showing the constitution of the bus classification unit shown in FIG. 3 more in detail.

FIG. 6 shows the constitution of the bus classification unit 210 shown in FIG. 3 more in detail. The bus classification unit 210 is divided by the insulating spacers 10 midway on the main bus units 100 and 110 and houses the central conductors 2 for three phases in a batch in the grounding tank 1 divided by the insulating spacers 10. Midway on the central conductor 2, a disconnecting switch 18, a breaker 17, and a disconnecting switch 19 are installed. At both ends of the breaker 17, grounding switches 20 and 21 with one end of each of them connected to the grounding tank 1 are installed. In the bus classification unit 210, the current breaking performance is required, so that $SF_6$ gas 22 is charged in the grounding tank 1 as insulating gas.

According to this embodiment described above, for the line unit 190 having a switching unit, the bus connection unit 200, and the bus classification unit 210, $SF_6$ gas 22 which is superior in the arc extinguishing performance from the viewpoint of switching performance of large current and is conventionally used is used and for the main bus units 100 and 110 including no switching unit (the breaker 5, etc.) and the connection bus unit 160, gas having a smaller warming coefficient than that of $SF_6$ gas 22, that is, nitrogen gas 23 contained in the atmosphere at a rate of about 4/5, or air, is used.

The reason of appropriate use of insulating gas to be charged into the grounding tank 1 of each unit as mentioned above is that the GIS requires the high voltage insulation performance and large current switching performance. With respect to the insulation performance, several types of gases superior to $SF_6$ gas have been found, while with respect to the arc extinguishing performance controlling the current breaking performance, no gas superior to $SF_6$ gas is not found at present.

Recently, reduction of the GIS is progressing and a unit having a switching unit is miniaturized. This is because the size of the air outlet is decided by the atmospheric insulation and hence the rate of the volume of the line bus portion connecting the unit having a switching unit and the air outlet occupying the whole volume of the GIS is increasing. Recently, the rate of the volume of the line bus portion connecting the unit having a switching unit and the air outlet occupying the whole volume of the GIS is 50% or more.

Therefore, in this embodiment, since the GIS structured as mentioned above appropriately uses insulating gas to be charged in the grounding tank 1 of each unit, the amount of $SF_6$ gas occupying the GIS can be controlled to 50% or less unless the current breaking performance originally requested to the GIS is damaged. By doing this, the use amount of $SF_6$ gas for earth warming prevention which is in discussion at present can be substantially reduced.

The dielectric strength of nitrogen gas is about 1/3 of that of $SF_6$ gas at the same pressure. Therefore, when nitrogen gas is to be used at the same gas pressure as that of $SF_6$ gas, it is necessary to increase the insulation size of a unit charged with nitrogen gas to about three times. This increase in the insulation size will not cause an increase in the whole size of the GIS, so that such a partial increase in size will not cause a big problem in the GIS making progress in reduction.

When it is attempted to control the unit size to the same size as that of the unit using $SF_6$ gas, the pressure of nitrogen gas is increased to about three times. In this case, it is necessary to increase the thickness of the grounding tank 1 and ensure the pressure resistance performance. However, the maximum pressure is about 10 atmospheres and hence it is not a substantial increase. The same may be said with a case that air is used.

Figure 7:
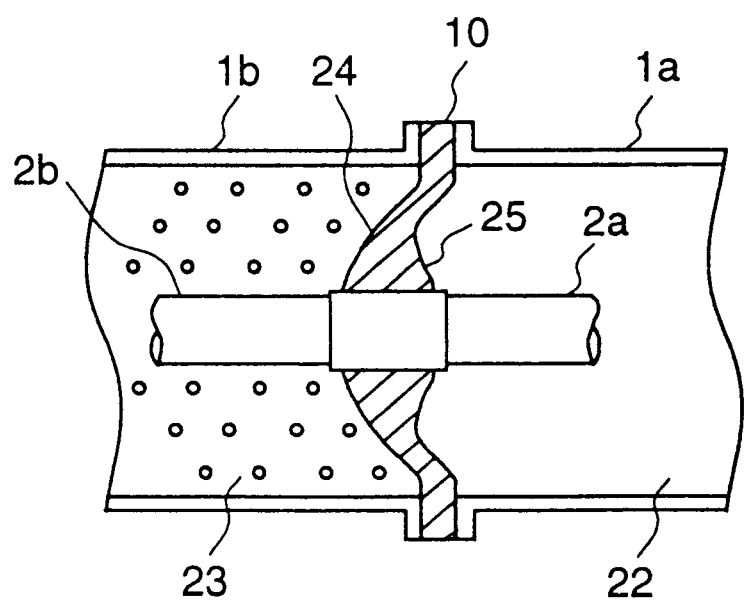
FIG. 7 is a cross sectional view showing the constitution of an insulating spacer used in the gas insulation switch of this embodiment.

FIG. 7 shows the essential portion of the insulating spacer 10. When a central conductor 2a in a grounding tank 1a of a unit having a switching unit which is charged with $SF_6$ gas 22 and a central conductor 2b in a grounding tank 1b of a unit having no switching unit which is charged with $SF_6$ gas 23 are separated from each other via an insulating spacer 10, a difference is often caused between the pressure of the grounding tank 1a and the pressure of the grounding tank 1b. The reason is that, as mentioned above, $SF_6$ gas and nitrogen gas are different in withstand voltage and in such a combination of units, the pressure of nitrogen gas is often increased, that is, the nitrogen gas 23 side is higher in pressure than the $SF_6$ gas 22 side. Therefore, this embodiment uses the conical insulating spacer 10 and arranges the units so that the convex 24 side thereof is the high pressure side (the nitrogen gas 23 side) and the concave 25 side is the low pressure side (the $SF_6$ gas 22 side). Therefore, a use method which is economically efficient and highly reliable can be applied without increasing the strength of the insulating spacer.

Although not shown in the drawing, if a trouble should occur in a unit having a switching unit inside the GIS, it is necessary to collect $SF_6$ gas charged in the grounding tank 1 of the unit and recover the trouble. In this case, if the collection time is longer though depending on the capacity of the collection tank, the recovery may require a lot of time. Therefore, in this embodiment, aiming at that nitrogen gas charged in the grounding tank of the bus unit which stops operation due to the trouble can be emitted into the atmosphere, when the aforementioned condition is generated, if the nitrogen gas charged in the grounding tank of the bus unit is emitted into the atmosphere and the pressure in the grounding tank is reduced or the grounding tank is evacuated, the grounding tank may be used as a temporary $SF_6$ gas collection container. By this method, $SF_6$ gas can be collected in a short time, so that the trouble recovery time can be shortened. Furthermore, the method does not let $SF_6$ gas leak into the atmosphere. Therefore, a highly reliable gas collection method can be provided.

What is claimed is:

1. A gas insulation switch comprising:

a main bus unit, a bus unit connected to an outer electric power transmission line, and a line unit for connecting said main bus unit to said bus unit through a contactor, wherein said main bus unit and said line unit is sealed with an insulator, wherein said main bus unit is charged with an insulating gas having a smaller earth warming coefficient than that of $SF_6$ gas, and said line unit is charged with said $SF_6$ gas.

2. A gas insulation switch as defined in claim 1, wherein said bus unit is charged with an insulating gas having a smaller earth warming coefficient than that of $SF_6$ gas.

3. A gas insulation switch comprising:

a main bus unit, a bus unit connected to an outer electric power transmission line, and a line unit for connecting said main bus unit to said bus unit through a contactor, wherein said main bus unit and said line unit is sealed with an insulator, said gas insulation switch characterized in that said bus unit is charged with an insulating gas having a smaller earth warming coefficient than that of $SF_6$ gas, and said line unit is charged with said $SF_6$ gas.

4. A gas insulation switch as defined in claim 1, wherein said main bus unit is charged with an insulating gas having a smaller earth warming coefficient than that of $SF_6$ gas.

5. A collection method in a gas insulation switch comprising a container charged with an insulation gas containing an electrical conductor and at least a pair of separable contactors, said container being sealed with an insulator so as to form a plurality of gas sections, wherein said gas sections which do not contain said separable contactors are charged with an insulating gas having a smaller earth warming coefficient than that of said insulation gas charged in said gas section which contains said separable contactors and is used as a gas collection container by discharging said insulation gas therein when an accident occurs.

* * * * *